July 2, 1929.  E. RAWSON  1,719,081
AUTOMATIC CONTROL VALVE
Filed Sept. 2, 1927  2 Sheets-Sheet 1
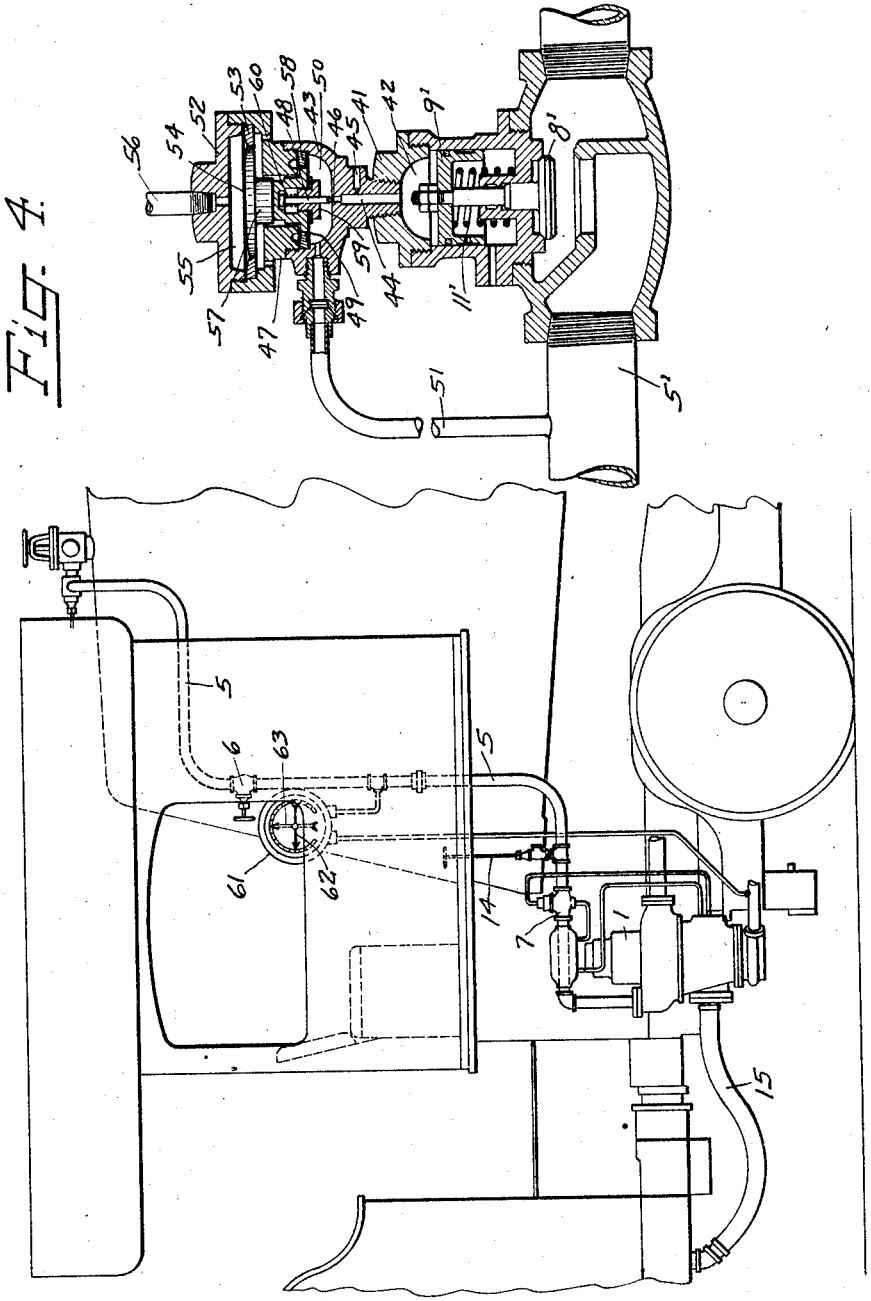
INVENTOR.
EMANUEL RAWSON
BY
ATTORNEY.

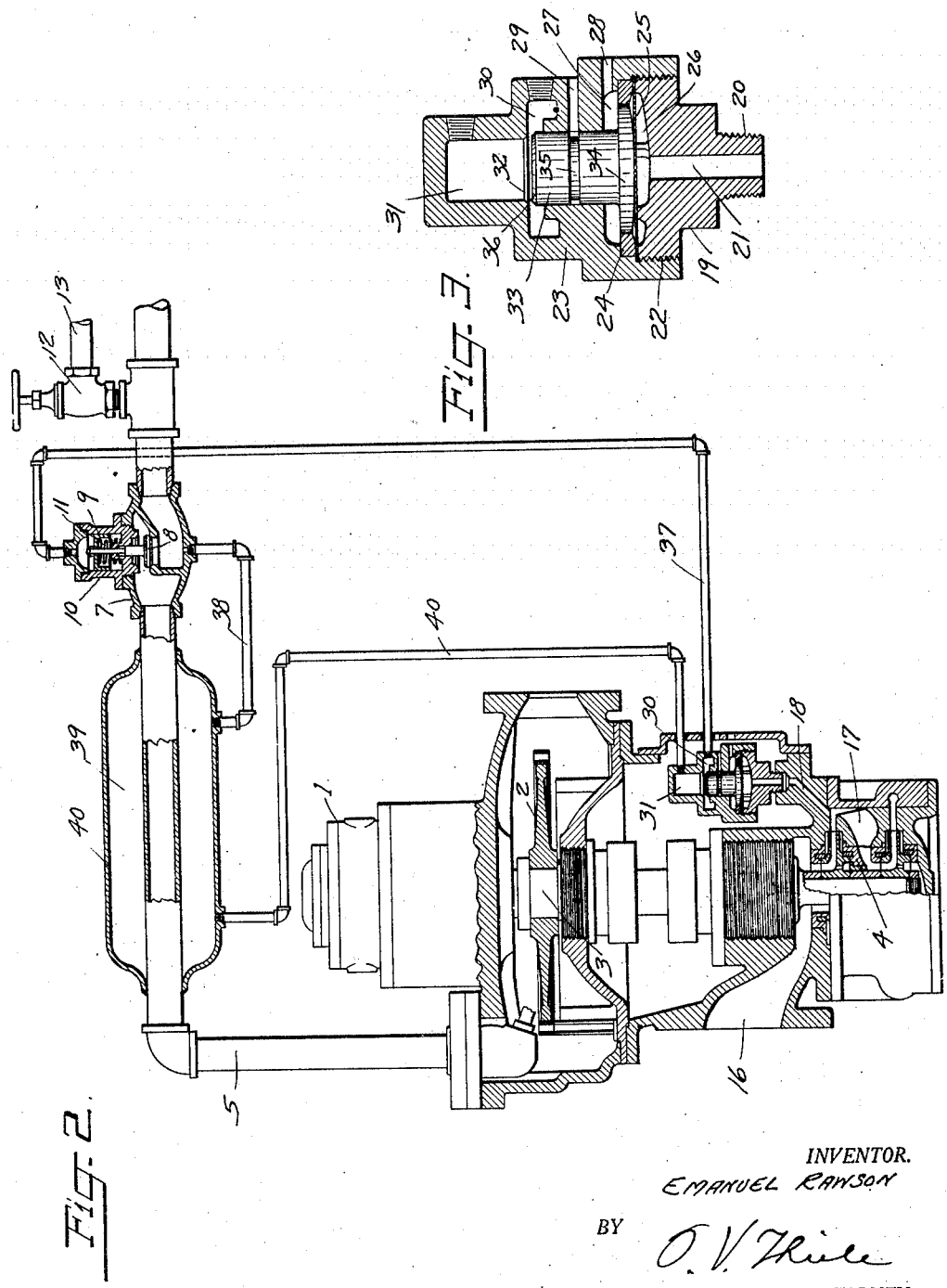

Patented July 2, 1929.

1,719,081

UNITED STATES PATENT OFFICE.

EMANUEL RAWSON, OF CHICAGO, ILLINOIS, ASSIGNOR TO THE SUPERHEATER COMPANY, OF NEW YORK, N. Y.

AUTOMATIC CONTROL VALVE.

Application filed September 2, 1927. Serial No. 217,118.

My invention relates to automatic control valves, and has particular reference to emergency stop valves of the type designed to prevent overspeeding of fluid pressure driven pumping units.

The invention is particularly adapted for use with steam turbine-driven centrifugal pumps, and will be described in connection with such a unit operating as a feed water pump for a locomotive, although it is to be understood that the invention is equally applicable in any case where it is desired to prevent overspeeding of a unit of this general character.

With the general object in view of automatically preventing the starting of such a unit except under proper load conditions and of automatically stopping the unit when the load thereon is relieved, the invention consists in the novel combination and arrangement of elements which may best be understood from a consideration of a preferred form of the invention described in detail hereinafter and illustrated in the accompanying drawings.

In the drawings, Fig. 1 is a fragmentary elevation of a locomotive provided with a turbine-driven centrifugal feed water pump to which my invention has been applied. Fig. 2 is a diagrammatic elevation partly in section on a larger scale illustrating the apparatus. Fig. 3 is a sectional detail of Fig. 2 on a still larger scale, and Fig. 4 is a sectional view of a modified form of the invention.

Referring now to Figs. 1 and 2, the pumping unit indicated generally at 1 comprises a turbine having a rotor 2 mounted on a vertical shaft 3, the lower end of which carries the centrifugal pumping element 4. As the details of this apparatus form no part of the present invention, they need not be described in further detail.

Steam is admitted to the turbine rotor 2 through the conduit 5, in which is located the throttle valve 6 under the control of the pump operator. Between valve 6 and the turbine nozzles there is a stop valve comprising a housing 7 in which is seated the valve 8, the latter having attached to its stem a piston 9 enclosed in the cylindrical housing 10 attached to the main valve housing 7. Housing 10 is capped to provide a suitable chamber above piston 9, the latter being urged to its upper position by the spring 11. Normally under the influence of spring 11 the valve 8 is in open position.

In the steam inlet conduit 5 between valves 6 and 8 there is located an ordinary globe relief valve 12 which vents this section of the conduit 5 to the atmosphere through the pipe 13. The control handle for valve 12 is carried by means of an extension rod 14 through the floor of the locomotive cab where it is within reach of the operator. The purpose of this relief valve will appear hereinafter.

Water is admitted to the pump through the inlet conduit 15 and passage 16, and is delivered from the pump rotor under pressure into chamber 17, from which a passage 18 leading through the pump housing carries water under pressure to the hydraulic control unit illustrated in Fig. 3.

The hydraulic control unit comprises a fitting 19 adapted to be secured to the pump housing by means of the threaded boss 20 and having a central passage 21 bored therethrough which is in communication with the passage 18 when the member 19 is screwed in place. Member 19 is externally threaded at its upper end at 22 to receive a cap 23, the latter being internally recessed to carry a retaining ring 24 which clamps in place a diaphragm 25. The upper face of member 19 is recessed so that a closed chamber 26 is formed between member 19 and diaphragm 25, this chamber being in communication with passage 21. Above the shoulder holding the retaining ring 24 the cap 23 is recessed to provide a chamber 27 above the diaphragm 25, chamber 27 being vented to the atmosphere by port 28. Above the chamber 27 and in line with passage 21, the cap 23 is provided with a cylindrical bore, vented to the atmosphere about midway of its length by the passage 29, and connecting chamber 27 with a second chamber 30. Above chamber 30 the cap 23 is extended to form a third chamber 31, and the walls of the cap at the base of chamber 31 are bevelled to form a suitable valve seat 32. Located in the bore connecting chambers 27 and 30 is the cylindrical valve member 33, having a flange 34 at its lower end adapted to fit loosely within the clamping ring 24 and rest upon the diaphragm 25. An annular recess 35 is formed in the member 33 so that it registers with the vent passage 25 when the valve is in its lower position. At its upper end, valve 33 is provided with a bevelled face 36 adapted to engage seat 32.

A conduit 37 connects chamber 30 of the hydraulic control unit with the chamber above piston 9 in the shutoff valve previously described. The inlet side of the valve housing 7 is connected by means of pipe 38 with the annular closed chamber 39 formed by a section of large diameter pipe 40 placed around a portion of the steam pipe 5 and suitably secured thereto. Chamber 39 is in turn placed in communication with chamber 31 of the hydraulic control unit by means of the pipe 40.

The operation of the device is as follows: Assuming the steam supply shut off, water available at the pump, and the relief valve 12 closed, steam admitted to the supply line 5 by opening of the throttle valve 6 passes directly to the turbine element 2 through the stop valve 8, which is normally held in open position by spring 11. At the same time live steam passes through conduit 38 into chamber 39, the flow of steam into chamber 39 being comparatively slow due to the presence of a restricted opening to conduit 38. Chamber 39 gradually is filled with steam, which flows from it through pipe 40 to the chamber 31 of the hydraulic unit. The purpose of the expansion chamber 39 and the restricted conduit 38 is to provide a time interval after steam is turned on before pressure will be built up in chamber 31. During the interval when steam pressure is building up in chamber 31, the pump is brought up to speed by the admission of steam through the inlet conduit 5 and the water pressure resulting in chamber 17 is carried through passages 18 and 21 to the diaphragm chamber 26, thereby forcing the diaphragm, and with it the valve member 33, upward so that the face 36 engages the seat 32 and closes communication between chambers 31 and 30.

Under these conditions it will be seen that the pump will continue to operate as long as the water pressure in chamber 16 holds the valve member 33 in its upper or closed position. If for any reason the water supply to the pump fails, the delivery pressure maintained in chamber 26 will also fail and under the influence of steam pressure in chamber 31 the member 33 will be forced to its lower position. The moment this occurs live steam is permitted to flow through conduit 37 to the chamber above piston 9, forcing the stop valve 8 to its closed position against the pressure of spring 11, thereby stopping the turbine and pump before serious overspeeding occurs due to lack of load on the pump.

The closing of valve 8 indicates to the operator that there is no load on the pump and under such conditions the throttle valve 6 is closed until the condition can be remedied.

It will be apparent that when the throttle valve 6 is closed after the closing of valve 8, a considerable quantity of steam is trapped in the supply conduit 5 between valves 6 and 8 and also in chamber 39 and conduits 37, 38 and 40.

In order to permit the valve 8 to re-open, pressure on the piston 9 must be relieved, and while condensation of the trapped steam would eventually permit valve 8 to re-open, the hand-operated vent valve 12 is provided to relieve the pressure of the trapped steam and permit the pump to be quickly re-started if water is available at the pump.

The apparatus just described, in addition to automatically stopping the pump in case of failure of the water supply, also prevents starting of the pump when no water is available.

Assuming no water available, it will be seen that upon opening the throttle 6, steam will flow through conduits 38 and 40 and chamber 39 to the hydraulic unit chamber 31, and from the latter pass directly through the chamber 30 and conduit 37 to the chamber above piston 11, forcing the latter down and closing valve 8, this action being permitted because of the fact that the lack of water in the pump permits the valve 33 in the hydraulic control unit to remain open. If it is attempted to start the pump with no water, the turbine and pump will, of course, start to operate under the influence of steam admitted to the turbine during the time it takes for steam to pass through the several conduits from the inlet side of valve housing 7 to the piston 11, but the time interval is so short that the valve 8 is closed before the turbine and pump have an opportunity to reach an extreme speed.

The expansion chamber 39 or its equivalent is necessary to provide a certain time element in the operation of the device for if such a delay as is provided were not introduced, steam admitted to chamber 31 of the hydraulic unit would pass to the piston 11 and close valve 8 before the pump had time to create a delivery pressure, even though water were available at the pump end. Obviously, the necessary delay in allowing live steam to pass to the piston 11 could be accomplished by using a very small restriction somewhere in the connection between the inlet side of housing 7 and the chamber above piston 11, but the opening through such a restriction would be so small that in service it would be likely to become clogged, and I therefore prefer to use the expansion chamber 39 which enables me to make use of much larger steam passages.

For application to pumps designed for use on locomotives, where service conditions are extremely severe, I prefer to use the form of construction shown in Fig. 2, in which the hydraulic unit is placed within the pump housing where it is protected from damage from outside sources and is also protected against freezing in cold weather. Similarly, the chamber 39 is preferably made as an annulus around the steam pipe 5, as by this arrangement the most compact and rugged construction can be obtained and the danger of freezing minimized.

Referring now to Fig. 4, I have shown a modified form of apparatus in which the hydraulic unit is incorporated with the shut-off valve to form a single unit. Referring to the figure, the live steam inlet conduit is indicated at 5', this conduit being closed by the valve 8' carrying piston 9', the latter being urged to upper position by spring 11'. Cap 41 forms a chamber 42 above piston 11', and in the top of cap 41 is screwed a cup-shaped member 43 having a passage 44 bored centrally therethrough, said passage being provided with a small atmospheric vent 45 and a valve seat 46 at its upper end. A second member 47 screws into member 43 and holds in place a clamping ring 48 over a flexible diaphragm 49. Between diaphragm 49 and the recess in the upper part of member 43 is formed the chamber 50 which is placed in communication with the inlet pipe 5' by means of conduit 51, the latter preferably being provided with a suitable expansion chamber (not shown). The upper end of member 47 is recessed and receives a cap 52 holding in place a clamping ring 53 and diaphragm 54. The cap 52 forms a closed chamber 55 above diaphragm 54, this chamber being placed in communication through conduit 56 with the delivery side of the pump. Diaphragms 49 and 54 are held in spaced relation by means of a plunger 57, the latter being recessed at its lower end to receive a metering pin 58 secured in place by the plug 59 and held in upper position by spring 60.

The operation of this device is in principle the same as that previously described. Normally valve 8' is held open and the metering pin 58 is held off its seat 46. If steam is admitted to the turbine when water is not available at the pump or if when the pump is running the water supply fails, live steam admitted through conduit 51 will pass directly past the metering pin 58 and through passage 44 to the chamber 42, and acting on piston 9' will close valve 8' against the pressure of spring 11'. If water is available and the pump is delivering water against the proper pressure, the delivery pressure of the pump is transmitted through conduit 56 to chamber 55, and acting on the diaphragm 54 forces the plunger 57, and with it the metering pin 58, downwardly until the latter seats at 46 and prevents the passage of live steam to chamber 42. In this case the valve 8' remains open under the influence of spring 11'.

In order to permit the piston 9' to rise after having been forced downward by steam admitted to chamber 2, a small atmospheric vent 45 is provided to relieve the pressure in this chamber, the vent being made considerably smaller than the passage past the metering pin 58 in order that pressure can be built up in chamber 42 when desired.

In all cases where my invention is used, it is desirable to provide a compound gauge for the guidance of the operator. Such a device is illustrated at 61 in Fig. 1, comprising one indicating hand 62 which registers the steam pressure in the supply conduit 5 beyond the throttle valve 6, and a second hand 63 which registers the delivery pressure from the pump. In normal operation, the hand 63 will rise to a pressure slightly above boiler pressure, and when in this position it indicates that the pump is delivering water to the boiler. The hand 62 will under normal conditions rise to a point somewhat below boiler pressure and the pressure indicated by this hand will give an approximate indication of the capacity at which the pump is operating. If for any reason the water supply to the pump fails, the hand 63 will drop to zero and hand 62 will, upon the closing of the valve 8, rise to approximately boiler pressure. This change in the position of the hands of the gauge will give immediate indication that the water supply to the pump has failed, and that the steam supply to the pump turbine has been shut off by the automatic control valve.

From the foregoing illustrative examples of my invention, it will be readily apparent that numerous changes in the arrangement of the apparatus may be made without departing from my invention, which is to be considered as including all such forms of apparatus as may fall within the scope of the appended claims.

I claim:

1. In apparatus of the class described, a turbine, a pump driven thereby, a conduit connecting said turbine with a fluid pressure source, a throttle located in said conduit, a control valve located in said conduit between said throttle and said turbine, fluid pressure actuated means for closing said control valve, a hydraulic control unit comprising a valve adapted to be closed by the delivery pressure from said pump, a conduit leading from the inlet side of said control valve to the valve in said unit, a conduit leading from said last-named valve to said fluid pressure actuated means, and an expansion chamber in one of said conduits.

2. In apparatus of the class described, a turbine, a pump driven thereby, a conduit connecting said turbine with a fluid pressure source, a throttle located in said conduit, a control valve located in said conduit between said throttle and said turbine, fluid pressure actuated means for closing said control valve, a hydraulic control unit comprising a valve adapted to be closed by the delivery pressure from said pump, a conduit leading from the inlet side of said control valve to the valve in said unit, an expansion chamber in said conduit, and a conduit leading from said last-named valve to said fluid pressure actuated means.

3. In apparatus of the class described, a fluid pressure driven pump, a steam supply conduit leading thereto, a throttle in said conduit, a control valve located in said conduit between said throttle and said pump, fluid pressure actuated means for closing said valve, a connection leading from a point in the supply conduit between said throttle and said valve to the pressure actuated means for closing the valve, means actuated by the pump delivery pressure for closing said connection, and a manually operable valve for venting said connection.

4. In apparatus of the class described, the combination with a steam driven pump, of a steam supply conduit leading to said pump, a fluid pressure closed control valve located in said conduit, a connection leading from said conduit to said control valve, a valve located in said connection and operating in response to delivery pressure from the pump to close the connection, and an expansion chamber interposed in said connection between said conduit and said last-named valve, said expansion chamber being in the form of an annulus surrounding said conduit.

5. In apparatus of the class described, the combination with a steam driven pump having a casing, of a steam supply conduit therefor, a throttle located in said conduit, a control valve located in said conduit between the throttle and the pump, pressure actuated means for closing said valve, an expansion chamber surrounding the steam supply conduit, a hydraulic control unit located within the pump casing and comprising a valve closed by delivery pressure from the pump, a connection leading from the inlet side of the control valve to the expansion chamber, a connection leading from the expansion chamber to said last-named valve, a connection leading from said last-named valve to said pressure actuated means, and a manually operable valve for venting said expansion chamber and connections.

EMANUEL RAWSON.